July 19, 1966     J. K. SULLINS ET AL     3,261,779
PROCESS AND PLANT FOR TREATING SEWAGE
Filed April 10, 1962     3 Sheets-Sheet 1

INVENTORS
JOHN K. SULLINS and RICHARD W. SELF
BY

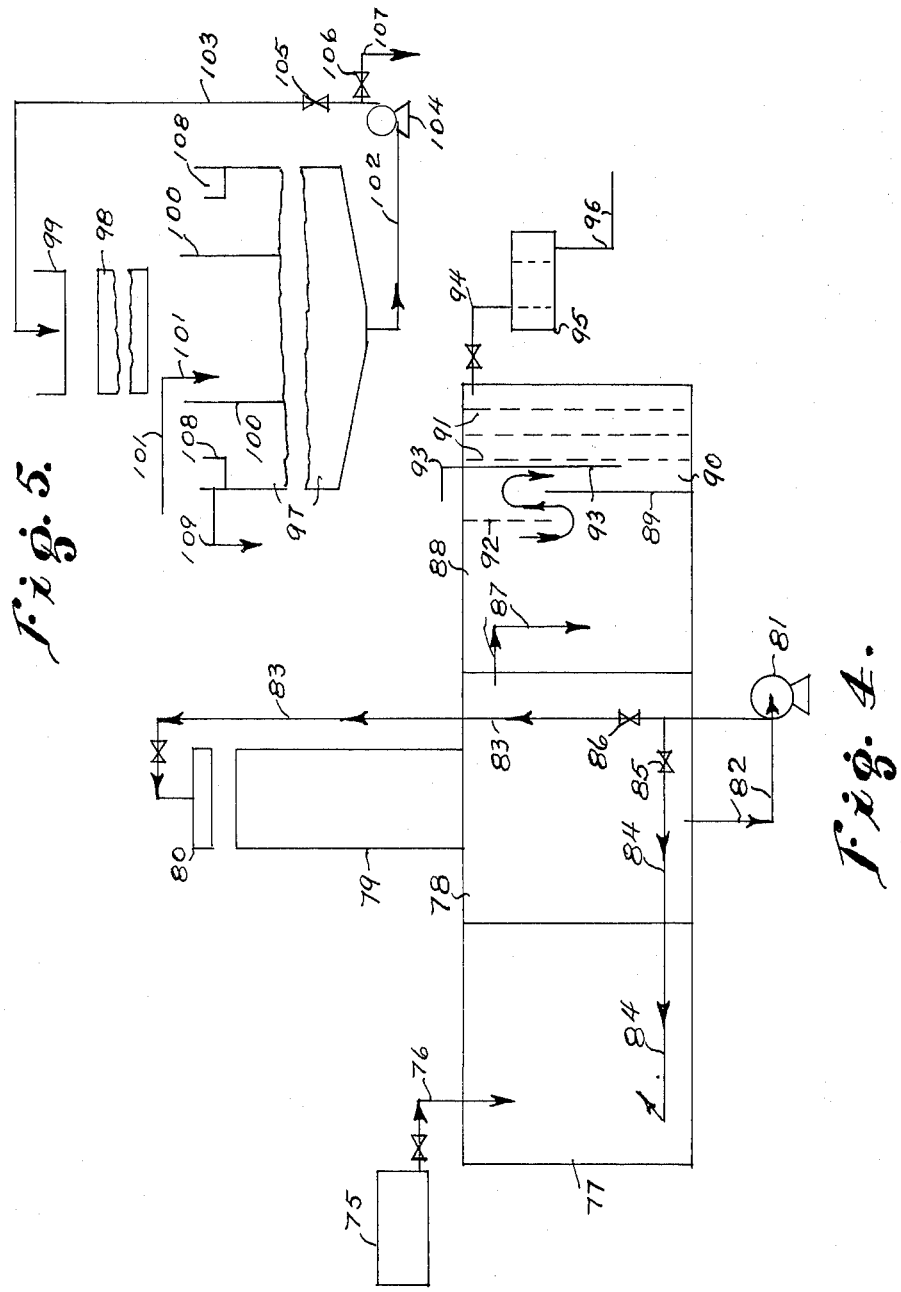

United States Patent Office 3,261,779
Patented July 19, 1966

3,261,779
PROCESS AND PLANT FOR TREATING SEWAGE
John K. Sullins, Kingsport, and Richard W. Self, Blountville, Tenn., assignors to The Mead Corporation, Dayton, Ohio, a corporation of Ohio
Filed Apr. 10, 1962, Ser. No. 186,370
17 Claims. (Cl. 210—5)

This invention relates to a high efficiency trickling filter waste treatment plant.

Generally, there is provided a trickling filter of conventional or known construction or of the special form disclosed and claimed in an application filed by Virgil A. Minch and John T. Egan in the U.S. Patent Office on September 7, 1960, Serial No. 54,538, now abandoned, entitled "Waste Treatment" and assigned to the assignee of this application. The trickling filter, which is herein disclosed as being of the vertically elongated or tower type, is positioned medially over a sump of relatively large volume but not so large that the liquid will become anaerobic. The sump levels out load surges, since the flow to the trickling filter will normally remain constant. A circulating pump constantly recirculates waste from the bottom of the sump and through the trickling filter.

Lint screens, sludge tanks, comminutors, etc., may be installed in the system ahead of the sump, and settling and/or chlorination chambers, after the sump, as desired.

The present disclosure is designed primarily for, but is not limited to, meeting the demands of smaller systems, such as, for example, which would be used by laundries, school, etc.

Normally, trickling filters are considered to reduce biological oxygen demand of an effluent by about 25%. Recycling through the filter will increase the efficiency to about 50%. If higher BOD removals are required, it is the normal practice to treat by activated sludge. Compared to trickling filters, an activated sludge system is more expensive to operate, cannot withstand shock loads and requires much closer supervision.

One of the main reasons for higher efficiency of activated sludge systems is longer retention time, which is hours compared to minutes for a normal trickling filter. This present system incorporates features of a trickling filter with the retention time feature of activated sludge. With a properly sized sump and trickling filter, efficiencies as high as that obtainable by activated sludge systems can be obtained.

An aerobic lagoon or a specially designed sump can be used. For most efficient operation, the sump can be based upon a conventional down-flow clarifier principle with raw wastes and trickling filter effluent discharging, for example, into a draft tube. Maximum recycle to raw feed is maintained and will depend upon organic loading and reduction desired. The sump is sized to total raw feed volume and total retention time required for desired stabilization.

This system will treat small volume wastes as well as large volumes. The only variables are trickling filter sump and recirculating pump sizes. The sump feature will level-out variations in flow and BOD loading. The system can be automated to require a minimum of supervision. Under certain conditions, clarification of suspended solids either before or after the unit may be necessary.

It is, accordingly, an object of the present invention to provide a high efficiency trickling filter plant utilizing a relatively large sump beneath a trickling filter and continuously operating means for recycling the waste in the sump through the trickling filter.

It is another object of the invention to provide a plant of the character described having treatment efficiencies comparable to activated sludge systems but with lower plant and operating costs and smaller space requirements.

It is a further object of this invention to provide a plant of the type disclosed having a trickling filter and a large sump therebeneath coupled for continuous recirculation, the sump receiving the raw wastes to level out load surges.

Other and further objects of the invention will become apparent from a reading of the following specification, taken in conjunction with the drawings, in which:

FIGURE 4 is a schematic system diagram of a further modification; and,

FIGURE 5 is a schematic diagram of a still further modification.

Figure 1:
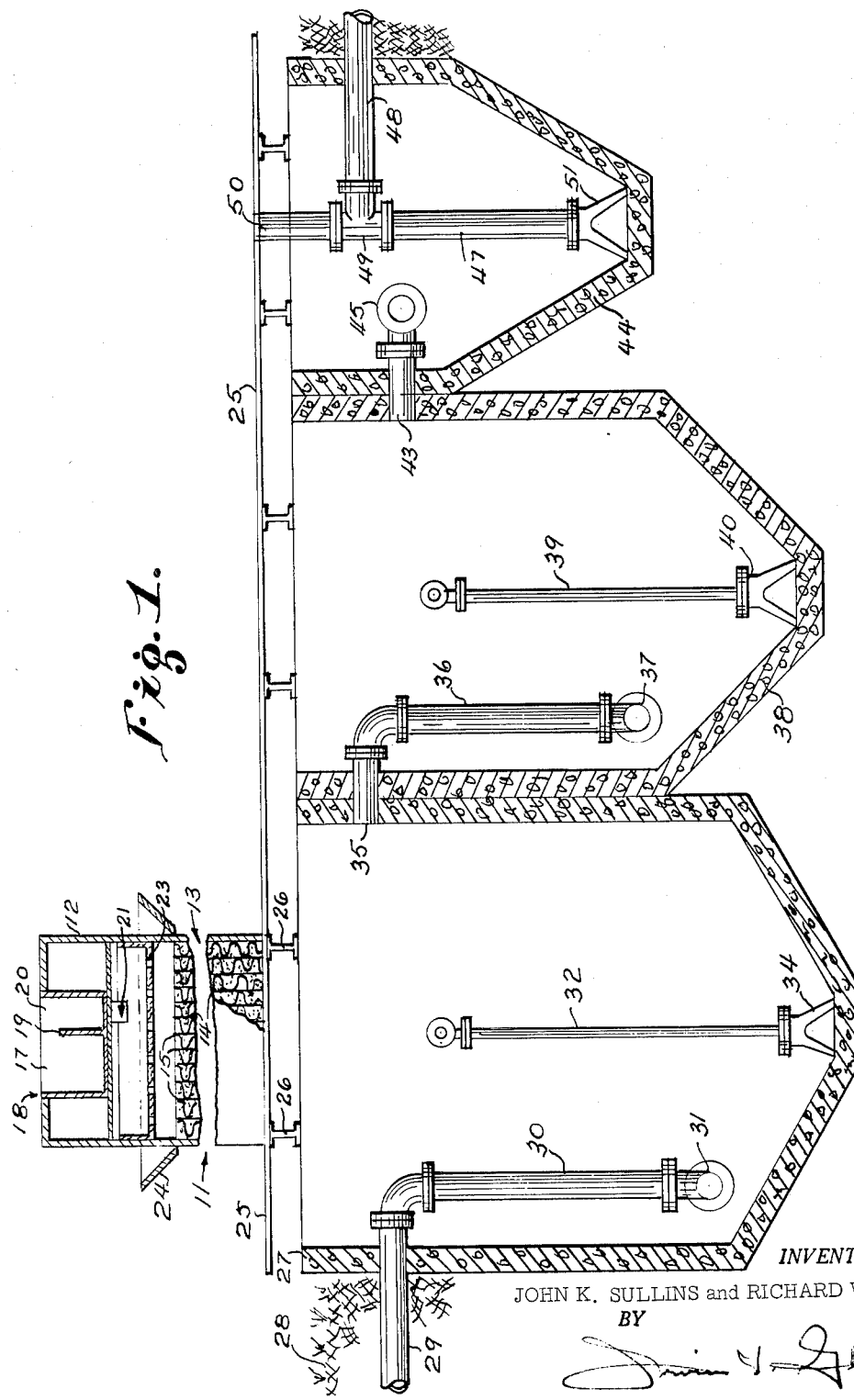
FIGURE 1 is an elevational view of a preferred embodiment of the invention in vertical medial section.
Figures 2, 3:
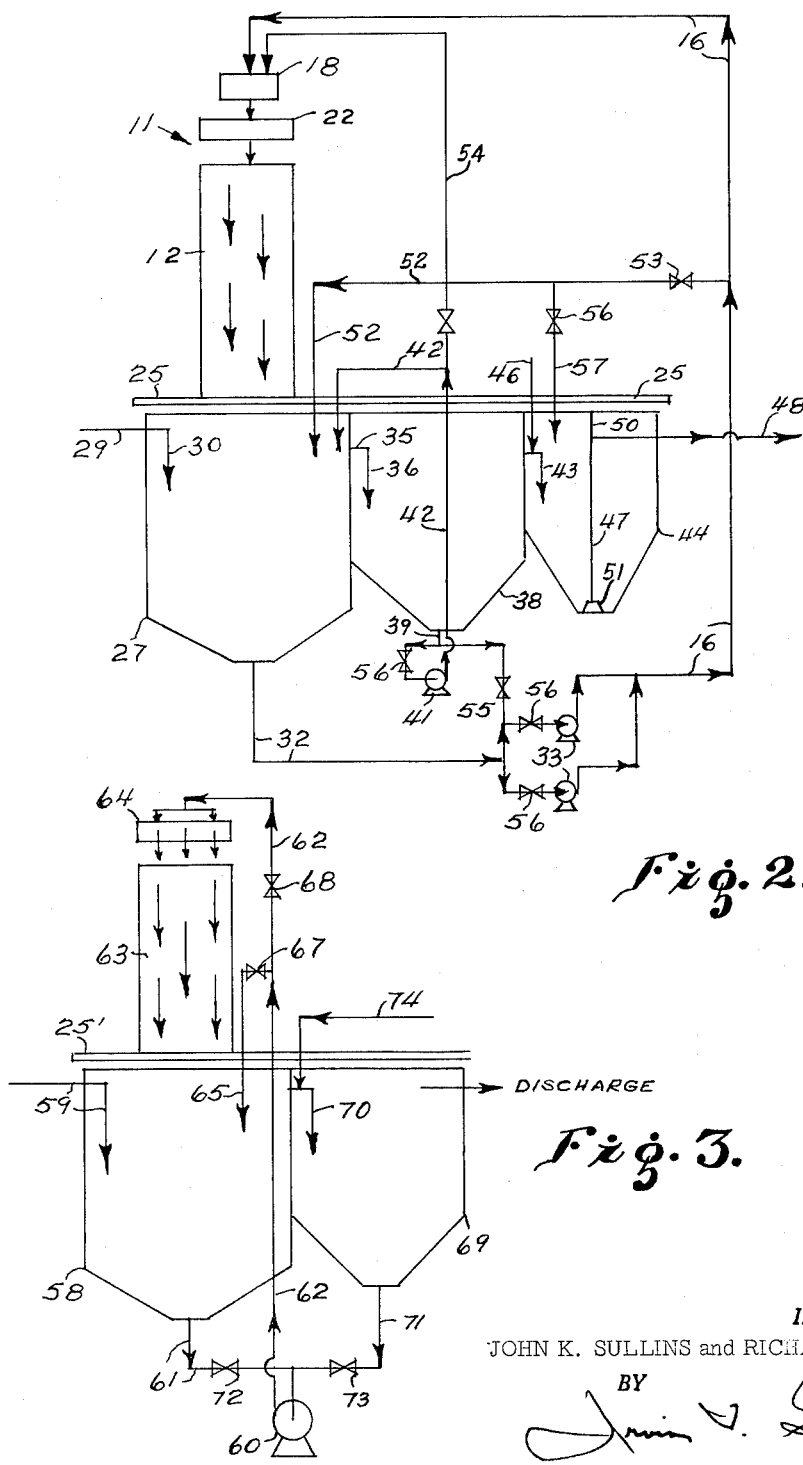
FIGURE 2 is a schematic diagram of the system embodied in the structure of FIGURE 1.
FIGURE 3 is a schematic diagram of a modified form of the basic system of FIGURE 2.

With reference to FIGURES 1 and 2, the numeral 11 generally designates a tower type trickling filter of conventional or of the special construction disclosed in the patent application identified above. Filter 11 comprises a vertically elongated rectangular or cylindrical casing 12 of sheet metal or other suitable material, which is desirably lined with a chemical resisting material, such as polyvinyl chloride. Casing 12 is filled almost to its upper end with filter units 13 each formed of a plurality of horizontally undulated sheets 14 of plastic material, impregnated paper or metal, separated by flat sheets 15 of similar material to define a multiplicity of vertical flow passages having collectively a very large surface area. Sheets 14 are shown vertically undulated in FIGURE 1 for the purpose of schematic illustration only.

Recirculated liquid enters filter 11 by flowing from pipe 16 into an input chamber 17 of flow box 18. The flow box 18 is divided by a baffle 19 defining input chamber 17 and output chamber 20. Chamber 20 has a discharge tube 21 directing the recirculated liquid to a distribution pan 22 having a ventilated bottom plate 23. A splash guard strip 24 desirably surrounds casing 12 adjacent its upper end, as shown.

Trickling filter 11 is supported on a welded bar grating 25 resting on I-beams 26. I-beams 26 bridge a reinforced concrete sump tank 27 which is herein shown as being almost completely buried in the ground 28.

Sewage or raw waste enters sump tank 27 through a feed pipe 29. The pipe bends downwardly at 30 and has a jet forming reducing L 31 at is lower end oriented to produce an agitating peripherally directed discharge stream. A pipe 32 conducts the sewage from the bottom of sump tank 27 to one or more pumps 33, FIGURE 2, for recirculation thereby through pipe 16 to the trickling filter 11. The lower end of pipe 32 is spaced from the bottom of sump tank 27 by a spider type pedestal 34.

Partially clarified and treated sewage overflows from sump tank 27 through a connecting pipe 35 which has a downward extension 36 terminating at another jet forming reducing L 37 oriented to produce an agitating peripheral horizontal discharge into the bottom of settling chamber 38 of reinforced concrete construction. Pipe 39 spaced from the bottom of the settling chamber 38 by spider type pedestal 40, pump 41 and pipe 42 recirculates the sludge or concentrated waste from settling chamber 38 to sump tank 27.

Overflow from settling chamber 38 flows through pipe 43 into a smaller chlorination chamber 44. Pipe 43 terminates in a jet forming reducing L 45 oriented to produce an agitating horizontal discharge peripherally of the chlorination chamber 44. Chlorinating fluid is injected by conventional apparatus, not shown, into input pipe 43 through conduit 46.

Chlorinated effluent is discharged upwardly through pipe 47 and laterally through its horizontal extension 48. A T 49 connects pipes 47 and 48 to each other and to an upwardly extending ventilation pipe 50. A spider type pedestal 51 spaces the lower end of pipe 47 from the bottom of chamber 44.

A recirculation line 52 controlled by valve 53 may be employed to bypass any desirable amount of recirculated sewage or waste from the sump tank around the trickling filter and back into the sump tank.

Another bypass line 54 controlled by a valve may be used to recirculate any desired part of the sewage from the bottom of the settling chamber 38 back to trickling filter 11. Other valves, collectively designated 56, are employed to selectively isolate pumps 33 and 41 or a shutdown bypass line 57.

In the species of FIGURE 3, raw waste enters a sump tank 58 through pipe 59 and is recirculated from the bottom of the sump by pump 60 through conduits 61 and 62 to and through a trickling filter 63 including a distribution box 64.

A filter-bypassing line 65 connects conduit 62 below the conduit valve 67 to the top of sump tank 58. Bypass flow through line 65 is controlled by valve 67 therein and by valve 68 in the upper part of conduit 62.

Overflow from sump tank 58 enters a combined clarifier and chlorination chamber 69 through pipe 70. Partially treated waste from the bottom of chamber 69 is pumped through a conduit 71 by pump 60 for recirculation back through the trickling filter 63 and/or sump tank 58, depending on the settings of valves 67 and 68 and of valves 72 and 73 which proportion the amounts of recirculation from tank 58 and chamber 69. Chlorinating fluid is forced through, at desired rate, a conduit 74 into the pipe 70 by conventional chlorinating apparatus, not shown.

Parts 58, 59, 61, 63, 64, 69 and 70 correspond closely in construction and function, respectively, to parts 27, 30, 32, 12, 22, 44 and 43 in the species of FIGURES 1 and 2.

In the species of FIGURE 4, raw waste first enters a lint screen box 75 from which filtered waste flows through pipe 76 into the first of two interconnected sludge tanks 77 and 78, the latter of which is also a sump tank above which trickling filter 79 is positioned. Trickling filter 79 includes a distribution box 80.

Sludge from the bottom of sump tank 78 is recirculated by pump 81 through conduits 82 and 83 back through the trickling filter 79 and/or through a horizontally discharging agitation branch conduit 84 and thence into the bottom of first sludge tank 77.

The recirculated sludge is proportioned between conduits 83 and 84 by valves 85 and 86 therein, respectively.

Overflow from sludge or sump tank 78 passes through a pipe 87 down into a settling chamber 88. Dam-type partition 89 separates chamber 88 from an adjacent chlorination chamber 90 having baffles 91 providing a horizontally tortuous flow path therethrough. A depending chemically resistant baffle membrane 92, as for example a suitable plastic membrane, prevents foam and sludge from spilling over into chlorination chamber 90. Tube 93 injects chlorinating fluid into chamber 90 well below the surface of the liquid therein.

Overflow from chamber 90 flows through a valved conduit 94 to a discharge box 95 which, in turn, discharges through outlet conduit 96.

In the species of FIGURE 5, sump 97 underlies a trickling filter 98 having a distribution pan 99. Directly below filter 98 is a draft tube 100 into which both the raw feed and the trickled waste are discharged, the former through conduit 101, for early and thorough aeration of the inflowing raw feed. Sludge from the bottom of sump 97 is recirculated through conduits 102 and 103 by pump 104 to trickling filter 98.

The amount of recirculation is controlled by valves 105 and 106, respectively, in conduit 103 and in a discharge conduit 107 for stabilized waste material. A circumferentially continuous internal launder ring 108 collects overflow from sump 97 and discharges the effluent through conduit 109.

While but certain forms of the invention have been shown and described therein, it will be readily apparent to those skilled in the art that many minor modifications may be made without departing from the spirit of the invention or the scope of the appended claims.

What is claimed is:

1. A high efficiency treatment plant for sewage or the like, comprising: a sump of a capacity for accommodating normally expected surges of sewage, a trickling filter, means for recirculating liquid from a lower portion of said sump to the input portion of said trickling filter, the output portion of said trickling filter discharging into the top portion of said sump, overflow means for said sump, a settling-treatment chamber interconnected to said sump by said sump overflow means, and means for selectively recirculating liquids from the lower portion of said settling-treatment chamber to said trickling filter and to said sump.

2. Structure according to claim 1, said trickling filter being disposed directly above said sump.

3. Structure according to claim 1, said plant additionally comprising an overflow means for said settling-treatment chamber interconnecting to a chlorination chamber.

4. Structure according to claim 1, said overflow means comprising a jet discharge portion oriented for producing a horizontally and peripherally directed sludge-agitating jet stream.

5. Structure according to claim 1, including means for injecting chlorinating fluid into said chamber.

6. Structure according to claim 5, said injecting means being coupled directly to said overflow means for more efficient mixing.

7. Structure according to claim 1 additionally comprising a chlorination chamber separated from said settling-treatment chamber by a dam-type partition.

8. Structure according to claim 7 additionally comprising a depending plastic membrane baffle positioned to prevent foam and sludge from spilling over said partition into said chlorination chamber.

9. A process for treating sewage or the like comprising feeding said sewage to a sump tank, overflowing a portion of said sewage in said sump tank to a settling chamber, constantly removing sewage from the lower portions of said tank and chamber and delivering the same to a trickling filter, and constantly discharging the filtered product of said filter into said tank.

10. A process for treating sewage or the like comprising feeding said sewage to a sump tank, overflowing a portion of said sewage in said sump tank to a settling chamber, providing a pump connected to the lower portions of said tank and said chamber, providing a control valve in said pump connection, delivering the outflow of said pump to a trickling filter, and constantly discharging the filtered product of said filter into said tank.

11. A process for treating sewage or the like comprising the provision of a series of successively interconnected sump tank, settling chamber and chlorination chamber and a trickling filter, discharging sewage to be treated into said tank, overflowing a portion of the contents of said tank into said settling chamber, overflowing a portion of the contents of said settling chamber into said chlorination chamber, providing pump means for pumping said sewage from the lower portions of said tank and said settling chamber to said trickling filter, and providing selective means for proportioning the rate of flow from said chamber and tank to said filter, and constantly discharging the filtered product of said filter into said tank.

12. A process for treating sewage or the like comprising feeding said sewage in an agitated manner to a sump tank, overflowing a portion of said sewage in said sump tank to a settling chamber, constantly removing sewage from the lower portions of said tank and chamber and delivering the same to a trickling filter, and constantly discharging the filtered product of said filter into said tank.

13. A process for treating sewage or the like comprising feeding said sewage in an agitated manner to a sump tank, overflowing a portion of said sewage in said sump tank to a settling chamber connecting a pump to the lower portions of said tank and said chamber, providing a control valve in said pump connection, delivering the outflow of said pump to a trickling filter, and constantly discharging the filtered product of said filter into said tank.

14. A high efficiency treatment plant for sewage or the like, comprising: a sump of a capacity for accommodating normally expected surges of sewage, means for introducing said sewage in an agitated manner in the lower portion of said sump, a trickling filter, means for recirculating liquid from a lower portion of said sump to the input portion of said trickling filter, the output portion of said trickling filter discharging into the top portion of said sump, overflow means for said sump, a settling chamber interconnected to said sump by said sump overflow means, and means for selectively recirculating liquids from the lower portion of said settling chamber to said trickling filter and to said sump.

15. A high efficiency treatment plant for sewage or the like, comprising: a sump of a capacity for accommodating normally expected surges of sewage, means including conduit means for introducing said sewage in a peripherally directed stream in an agitated manner in the lower portion of said sump, a trickling filter, means for recriculating liquid from a lower portion of said sump to the input portion of said trickling filter, the output portion of said trickling filter discharging into the top portion of said sump, overflow means for said sump, and a settling chamber interconnected to said sump by said sump overflow means.

16. A high efficiency treatment plant for sewage or the like, comprising: a sump of a capacity for accommodating normally expected surges of sewage, means for introducing said sewage in an agitated manner in the lower portion of said sump, a trickling filter, means for recirculating liquid from a lower portion of said sump to the input portion of said trickling filter, the output portion of said trickling filter discharging into the top portion of said sump, overflow means for said sump, a settling chamber interconnected to said sump by said sump overflow means, at least one sludge tank between said sump and the means for introducing said sewage, and a branch conduit connected to said recirculating means and discharging horizontally in said sludge tank adjacent the bottom thereof for agitating sludge therein.

17. The treatment plant of claim 16 additionally comprising a lint screen interposed between said sludge tank and the means for introducing said sewage.

References Cited by the Examiner
UNITED STATES PATENTS

| | | | |
|---|---|---|---|
| 2,008,507 | 7/1935 | Laughlin | 210—151 |
| 2,168,208 | 8/1939 | Jenks | 210—151 |
| 2,355,640 | 8/1944 | Fischer et al. | 210—151 |
| 2,714,090 | 7/1955 | Thompson et al. | 210—512 X |
| 2,901,114 | 8/1959 | Smith et al. | 210—7 X |
| 3,123,555 | 3/1964 | Moore | 210—151 X |
| 3,143,498 | 8/1964 | Fordyce et al. | 210—151 X |

OTHER REFERENCES

Mills: Development of Design Criteria For Biological Treatment etc., Proc. 14th Ind. Waste Conf., Purdue Univ. (1959) pp. 340–358, page 349 particularly relied on.

MORRIS O. WOLK, *Primary Examiner.*

M. E. ROGERS, *Assistant Examiner.*